United States Patent
Rai et al.

(10) Patent No.: US 7,505,073 B2
(45) Date of Patent: Mar. 17, 2009

(54) APPARATUS AND METHOD FOR DISPLAYING A VIDEO ON A PORTION OF A DISPLAY WITHOUT REQUIRING A DISPLAY BUFFER

(75) Inventors: Barinder Singh Rai, Surrey (CA); Eric Jeffrey, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 637 days.

(21) Appl. No.: 10/991,263

(22) Filed: Nov. 17, 2004

(65) Prior Publication Data
US 2006/0103752 A1    May 18, 2006

(51) Int. Cl.
H04N 5/222    (2006.01)
(52) U.S. Cl. .................................. 348/333.05
(58) Field of Classification Search ............ 348/333.05, 348/333.5
See application file for complete search history.

(56) References Cited

U.S. PATENT DOCUMENTS

| | | | |
|---|---|---|---|
| 5,729,303 A | 3/1998 | Oku et al. | |
| 5,754,253 A | 5/1998 | Lee | |
| 5,867,227 A | 2/1999 | Yamaguchi | |
| 5,875,000 A | 2/1999 | Yamaguchi | |
| 5,963,270 A | 10/1999 | Hwang | |
| 6,175,373 B1 | 1/2001 | Johnson | |
| 6,329,973 B1 * | 12/2001 | Akimoto et al. | 345/98 |
| 6,351,291 B1 * | 2/2002 | Asano | 348/564 |
| 6,384,868 B1 * | 5/2002 | Oguma | 348/564 |
| 6,449,018 B1 | 9/2002 | Yokoyama | |
| 6,493,038 B1 | 12/2002 | Singh et al. | |
| 6,556,252 B1 | 4/2003 | Kim | |
| 2002/0054233 A1 * | 5/2002 | Juen | 348/372 |
| 2003/0048383 A1 | 3/2003 | Casteleyn et al. | |
| 2004/0075769 A1 | 4/2004 | Shy et al. | |
| 2006/0007237 A1 * | 1/2006 | Jeffrey | 345/541 |

OTHER PUBLICATIONS

"System on Silicon-IC for Motion Compensated Scan Rate Conversion, Picture-In-Picture Processing, Split Screen Applications and Display Processing", Markus Schu, Gunter Scheffler, Christian Tuschen, and Armin Stolze, IEEE Transactions on Consumer Electronics, vol. 45, No. 3, Aug. 1999, (pp. 842-850).

"Digital Color Decoder for Pip-Applications", Andreas Rick, Thorsten Herfet, Stefan J. Prange, IEEE Transactions on Consumer Electronics, vol. 42, No. 3, Aug. 1996, (pp. 716-720).

"Microprocessor Controlled Picture in Picture System", Cesar A. Mancini and Carl Pantsios Markhauser, IEEE Transactions on Consumer Electronics, vol. 36, No. 3, Aug. 1990, (pp. 375-379).

* cited by examiner

Primary Examiner—David L Ometz
Assistant Examiner—Usman Khan
(74) Attorney, Agent, or Firm—Mark P. Watson

(57) ABSTRACT

A method for concurrently displaying an image and a video on a display having memory integrated therein comprises receiving position data defining a position of a top image region, receiving video data from a video source, and passing the video data directly to the display, i.e., without first storing the image within video RAM. In a first mode video data is passed directly to the display only when it corresponds to pixels outside of the top image region. In a second mode, video data is passed directly to the display such that entire successive images are wholly displayed within the top image region. The top image region is smaller than the entire display region.

22 Claims, 5 Drawing Sheets

400

| Horizontal PIP Start | 2 |
| Vertical PIP Start | 2 |
| Horizontal PIP End | 9 |
| Vertical PIP End | 9 |

| Column Address Start | 0 |
| Row Address Start | 0 |
| Column Address End | 19 |
| Row Address End | 1 |

| Column Address Start | 0 |
| Row Address Start | 2 |
| Column Address End | 1 |
| Row Address End | 2 |

| Column Address Start | 10 |
| Row Address Start | 2 |
| Column Address End | 19 |
| Row Address End | 2 |

Fig. 7C

APPARATUS AND METHOD FOR DISPLAYING A VIDEO ON A PORTION OF A DISPLAY WITHOUT REQUIRING A DISPLAY BUFFER

CROSS REFERENCE TO RELATED APPLICATIONS

The present application is related to a copending U.S. Patent Application No. 10/776,357 filed Feb. 11, 2004, and entitled, "Apparatus And Method To Connect An External Camera to an LCD Without Requiring a Display Buffer" which is wholly incorporated herein by reference.

BACKGROUND OF THE INVENTION

1. Field of the Invention

The present invention relates to image display systems and more particularly to display controllers that interface between a source of image data and a display device.

2. Description of the Related Art

Display controllers provide an interface between a data source and a display unit. The data source can, for example, include a central processing unit (CPU) that provides overall control of a pocket PC, hand-held PC, mobile phone, etc. The data source can also be a digital camera such as a CMOS camera that is included in a camera-enabled cellular phone with image capture capability, for example. The display unit can be, for example, a liquid crystal display.

Normally, a display buffer, i.e., video RAM (VRAM) is included in the display controller and is used to transfer image data to the display device. Thus, the image data is written to the VRAM, and then read out from the VRAM.

Sometimes, it is desirable to display more than one image on the display panel at the same time. For example, a moving image might be displayed with a message box or some other image overlapping a portion of the moving image. Alternatively, the moving image might be placed in one region of the screen which is otherwise filled with ancillary information. This method of displaying two images on a single display device is often referred to as "picture-in-picture" (PIP). For purposes of this document, PIP will include a "bottom image" which is sometimes referred to as a main image and fills one portion of the screen of the display device, and a "top image," sometimes referred to as a PIP image, which is the image displayed on another portion of the screen. Where the two images overlap, the top image will be displayed. Generally, the bottom image will fill the display screen, but this is not required. Although generally, the bottom image will display a video stream, it should be noted that either image can be a moving image and further that both the bottom and top images can be still images.

For graphics chips which contain VRAM, data defining the top image is typically stored along with the main bottom image data in the VRAM. The top image data in memory is typically updated by the host and is used to display brief messages.

A counter/timer circuit (CTC) in communication with a VRAM memory controller keeps track of where the top image will appear on the display. Appropriate control signals are provided to the memory controller to fetch data either associated with the bottom image or the top image. This data is then sent to a display interface which then provides the data to the display device.

Recently, RAM embedded liquid crystal displays (LCDs) have become available. These LCDs can store one frame of data, for example. An exemplary display controller utilizing RAM-integrated display devices is disclosed in a commonly-assigned, related application which is cited above and incorporated by reference. Instead of using VRAM, this previously-disclosed display controller provides a data pipeline and clock control that manages the data passing to the display. However, in the previously disclosed controller, there was no provision for displaying two images simultaneously on the display screen.

SUMMARY OF THE INVENTION

Broadly speaking, the present invention fills these needs by providing a method and apparatus for directly sending video data to portions of the display outside of the top image region.

It should be appreciated that the present invention can be implemented in numerous ways, including as a process, an apparatus, a system, a device, or a method. Several inventive embodiments of the present invention are described below.

In one embodiment, a method for concurrently displaying an image and a video on a display having memory integrated therein comprises receiving position data defining a position of a top image region, receiving video data from a video source, and passing the video data directly to the display, i.e., without first storing the image within video RAM. In a first mode, video data is passed directly to the display only when it corresponds to pixels outside of the top image region. In a second mode, video data is passed directly to the display such that entire successive images are wholly displayed within the top image region. The top image region is a subsection of the entire display region.

In another embodiment, a display controller for displaying a video and an image concurrently on a display includes a plurality of registers for storing top image position data defining a top image region which is a portion of the display and a display interface receiving video data from a video source. The display interface comprises logic circuitry causing the video data to be supplied directly from the video source to the display, i.e., without first storing a video data in video RAM. In a first mode, only video data corresponding to pixels outside of the top image region are passed to the display. In a second mode, the video data is passed directly to the top image region only, such that entire successive images defined by video data are wholly and successively displayed in the top image region.

In yet another embodiment, an imaging device comprises a video capture device; a display controller receiving video data from the video camera; a host microprocessor; and a display having memory integrated therein for displaying data stored in the memory as an image on a display screen. The display controller includes a plurality of registers for storing top image position data defining a top image region which is a portion of the display. The display controller also includes a display interface receiving the video data from the video camera. The display interface comprises logic circuitry causing the video data to be supplied directly from the video camera to the display. In a first mode, video data corresponding to pixels outside of the top image region are passed directly to the display and video data corresponding to pixels inside the top image region are prevented from being passed to the display. In a second mode, video data is passed directly to the top image region only such that entire successive images defined by the video data are wholly and successively displayed in the top image region.

Other aspects and advantages will become apparent from the following detailed description, taken in conjunction with the accompanying drawings, illustrating by way of example the principles of the invention.

BRIEF DESCRIPTION OF THE DRAWINGS

The embodiments will be readily understood by the following detailed description in conjunction with the accompanying drawings, and like reference numerals designate like structural elements.

FIG. 6 shows a table containing exemplary register values relevant to the illustration in FIG. 5.

FIGS. 7A, 7B, and 7C each show a table containing exemplary display register values relevant to the illustration in FIG. 5.

DETAILED DESCRIPTION OF THE PREFERRED EMBODIMENTS

Figure 1:
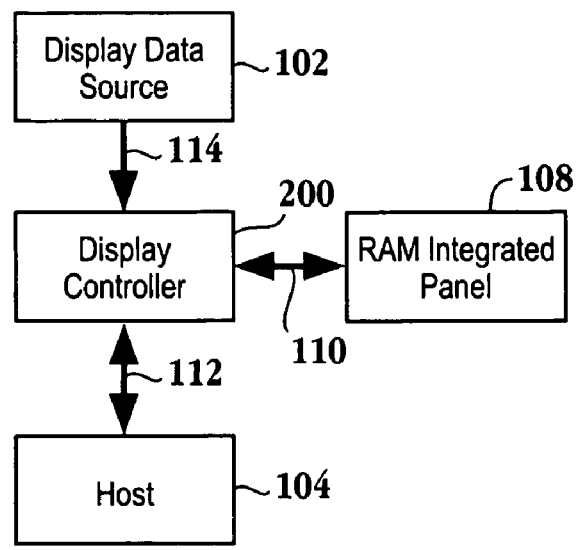
FIG. 1 shows a schematic overview of an electronic imaging device.

The present invention will be readily understood by the following detailed description in conjunction with the accompanying drawings, and like reference numerals designate like structural elements.

FIG. 1 is an illustration showing a high-level architecture of a device 100 for displaying digital image data. The device includes a display controller 200, a host 104, which may be a microprocessor unit (MPU), a RAM integrated panel 108, and a display data source 102. The display controller 200 provides the interface between the RAM integrated panel 108, host 104, and display data source 102.

The timing control signals and data lines between display controller 200 and RAM integrated panel 108 are shown generally as line 110. These may in fact be several separate lines but are shown generally as line 110. Host 104 performs digital processing operations and communicates with display controller 200 over line 112, which are shown as a single line but in fact may be several address, data, and control lines and/or a bus. All communication lines shown in the Figures will be presented in this manner.

The display data source 102 supplies the display controller 200 with a set of display data as indicated by an arrow 114. In various embodiments, display data source 102 can be a digital video camera, a digital camera, an electromagnetic transmission, a digital data storage device, or an external MPU host, among other suitable video capture and image capture devices. Depending on the particular embodiment, the display controller 200 can be configured with a data port, a network interface card, or an antenna, among others, to receive the set of display data provided from display data source 102. Additionally, display controller 200 can be configured to receive the set of display data in any format. For example, the set of display data may be in any suitable digital format, which includes various color formats, among others. In one embodiment, the set of display data is transmitted in digital format after having been captured and processed by digital imaging circuitry. In another example, the set of display data is transmitted in digital format after having been converted from the well-known JPEG format by a JPEG encoder/decoder (CODEC). In yet another example, the set of display data is transmitted in YUV format from an MPU host either associated with or external to the device for displaying digital image data. In yet another example, data may be transmitted as raw Bayer data.

Figure 2:
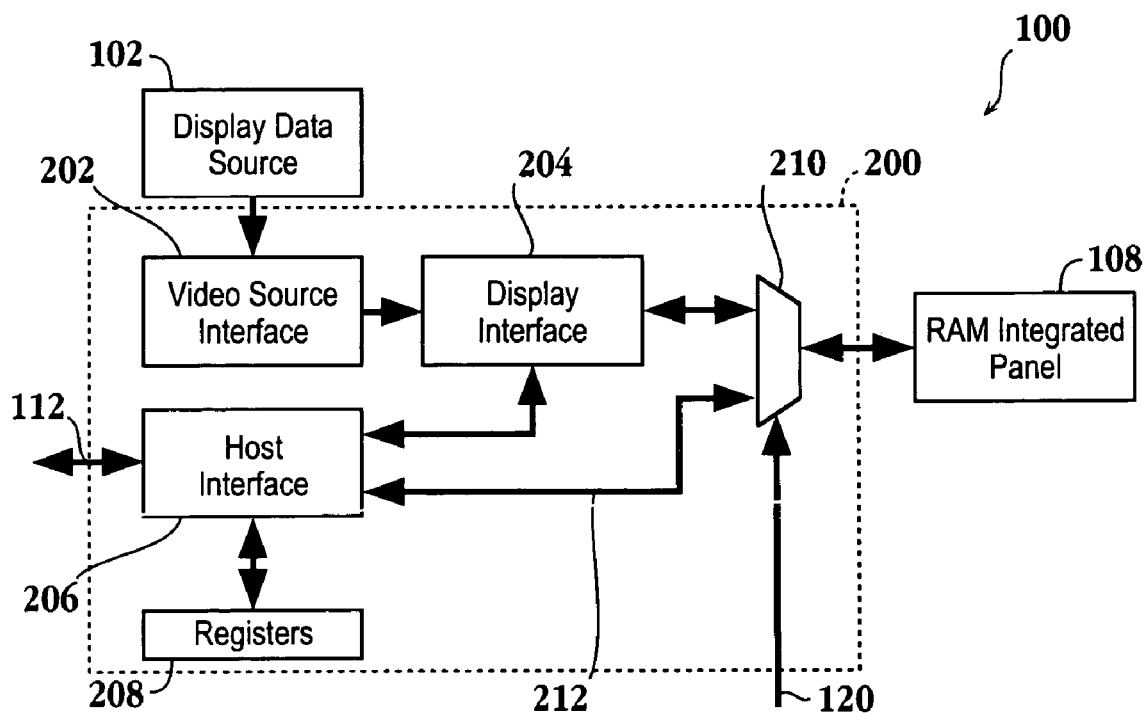
FIG. 2 shows a schematic overview of an exemplary display controller incorporated into the electronic imaging device of FIG. 1.

FIG. 2 shows a first exemplary embodiment of display controller 200. Inside display controller 200, which may be comprised of a single integrated circuit, video source interface 202 receives a video image from display data source 102. Display data source 102 may be a video camera, and source interface 202 may be a camera interface, for example. Image data may be in various formats as described above and as would occur to the ordinary practitioner. Source interface 202 receives image data and may perform some data manipulations such as resizing and format conversion. Alternatively, these functions may be implemented in display interface 204 or additional components (not shown) along the data path. Display interface 204 receives image data from source interface 202 and is in communication with host interface 206. Display interface is also in communication with RAM integrated panel 108 via multiplexer 210. Host interface 206 is in communication with host 104 (FIG. 1) and memory registers 208. Host interface 206 may also communicate directly with panel 108 via bypass line 212. Select signal 120 selects which of display interface 204 and host interface 206 will be in communication with panel 108. When display controller 120 is in a power-save mode, for example, select signal 120 connects host interface 206 with panel 108, thereby allowing the host 104 (FIG. 1) to write to panel 108 without powering up display interface 204 and other components.

Figure 3:
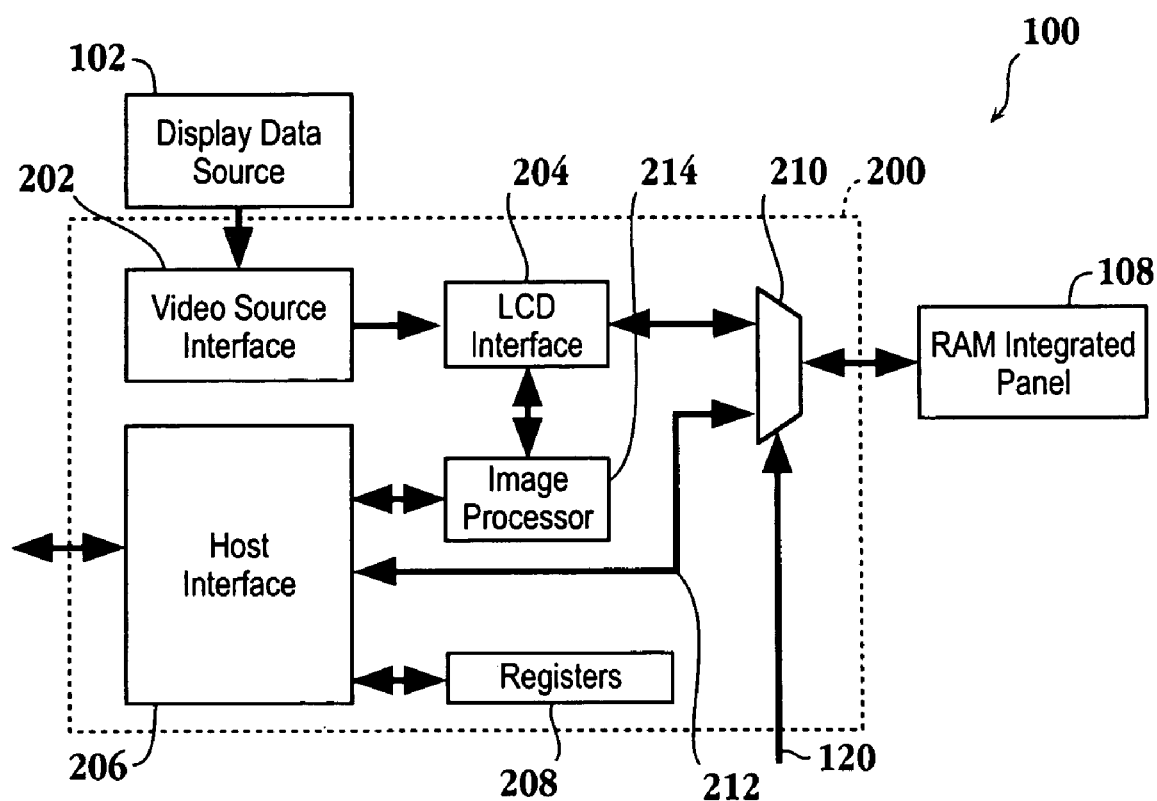
FIG. 3 shows a schematic overview of another exemplary display controller.

FIG. 3 shows an embodiment of device 100 including a display data source 102 passing video data to source interface 202. Source interface 202 may perform some processing such as resizing and/or format conversion, or these functions may be implemented elsewhere as mentioned above with respect to FIG. 2. Image data is passed to display interface 204 which is in communication with host interface 206 via image processor 214.

Image processor 214 may include logic circuits for encoding and decoding image compression algorithms and a first-in/first-out storage buffer. For example, image processor 214 may include circuits for converting an image retrieved via host interface 206 in a JPEG format into an RGB (red, green, blue) or YUV (luminance, chrominance) format. For example, image processor 214 may convert a JPEG image into an RGB image by converting it into a YUV image as an intermediate stage.

Figure 4:
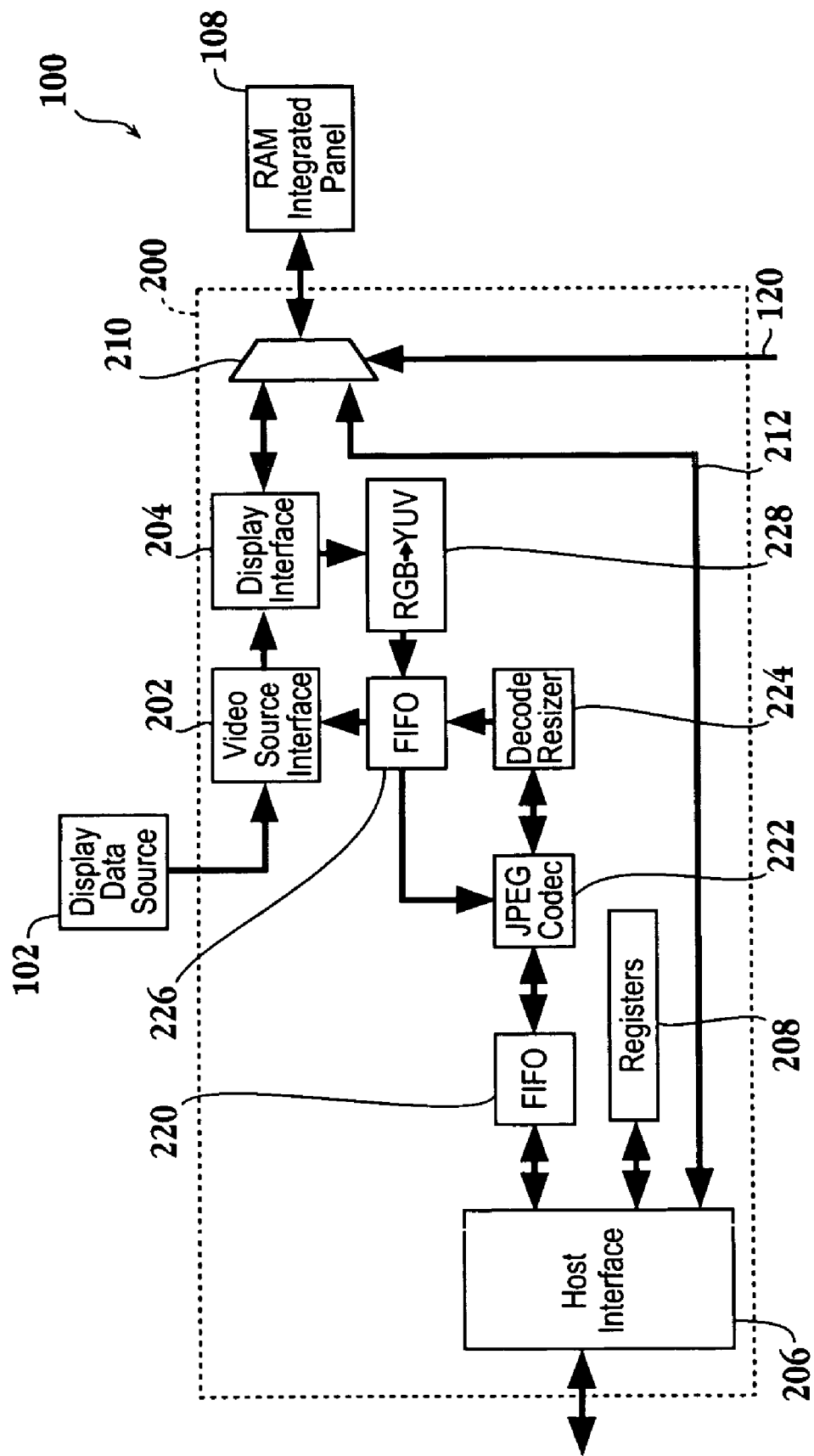
FIG. 4 shows a schematic overview of another exemplary display controller.

FIG. 4 shows an exemplary embodiment of display controller 200. Initially, an image to be displayed, such as a photo, may be provided by host 104 (FIG. 1) to host interface 206 via line 112. Host interface 206 passes image data, which is either a JPEG or RGB format to a first FIFO 220, which temporarily holds image data until JPEG CODEC 222 is ready to receive it. JPEG CODEC 222 retrieves image data from first FIFO 220. JPEG CODEC 222 outputs image data in YUV format to decode/resizer 224. Decode/resizer 224 passes YUV-formatted data to FIFO 226. Video source interface 202 converts YUV formatted image data in FIFO 226 to RGB format and passes it to display interface 204, which passes the data to RAM-integrated panel 108. Display interface 204 can also retrieve RGB data from RAM-integrated panel 108 and pass this RGB data to RGB-to-YUV converter 228. Alternatively, data from video source interface 202 can be directed by display interface 204 to RGB-to-YUV converter 228. From converter 228, image data is passed through FIFO 226, to JPEG CODEC 222, to FIFO 220 and to host interface 206. This data path allows a host (FIG. 1) to retrieve image data from the camera or from the display.

For the embodiments discussed herein, a composite image is generated from two images. A first image may be a video image, e.g., from display data source 102, and a second image, e.g., may be a still image, e.g., from host interface 206. To generate the composite image, one of the first and second images are placed in one portion of a display and the other is placed in another portion of the display. Where the two images overlap, the one designated as a top image will be displayed. Typically, the bottom image will be presented from display data source 102 and fill the entire display area, although this is not required, and the top image may be some message provided via host interface 206. For example, an incoming call message or battery-low indicator may be displayed. However, in another embodiment, the top image is a video and a bottom image is a still image. In yet another embodiment, the user/programmer determines which image is placed on top and which image is placed on the bottom. In the case where the image from display data source 102 is a video image, it refreshes periodically, e.g., 15 frames per second, without overwriting the still image in a manner described in more detail below.

Since there is no VRAM, the bottom image (alternatively the top image) received from display data source 102 is sent directly to RAM integrated panel 108 via the display interface 204. By "directly" it is meant that the data passes through the display controller without being written into, temporarily stored, and read out of VRAM. Image data is read from display data source 102 using a raster format. Generally, data is read one row of pixels at a time. During periods of time that data is read from display data source 102, data flows through source interface 202 and to display interface 204. Between each row of pixels, and between successive frames, no data is transmitted for short periods of time. These periods of time will be referred to as quiescent periods or non-scan time of the video data source.

RAM integrated panel 108 has certain registers programmed before panel 108 can receive the display data. For example, a rectangular box into which image data is stored for displaying on the screen may include column address start, row address start, column address end, and row address end. Once these registers in RAM-integrated panel 108 are programmed, data sent to RAM integrated panel 108 will be sent to the appropriate box. Instructions for programming display panel registers are sent during quiescent periods, and may even be sent between pixels, as will be described in further detail below.

Top image position data, including the top image horizontal start, top image vertical start, top image horizontal end and top image vertical end, are stored in registers 208 connected to host interface 206. Display interface 204 receives this top image position data via host interface 206.

In operation, top image position data from registers 208 are loaded into display interface 204. The top image position data defines a top image region that is smaller than the display screen as a whole. When display interface 204 receives image data for the bottom image, display interface 204 determines when a pixel assigned to the top image will be encountered, and programs RAM integrated panel 108 to receive data up to that point. If image data is received corresponding to pixels assigned to the top image, then these pixels are discarded so that, in the case where the video is displayed as the bottom image, the top image is not overwritten by successive images from display data source 102. In the case where the video is displayed as the top image, no data is discarded, but RAM integrated panel 108 is programmed to receive data only to the area defined by the top image position.

Figure 5:
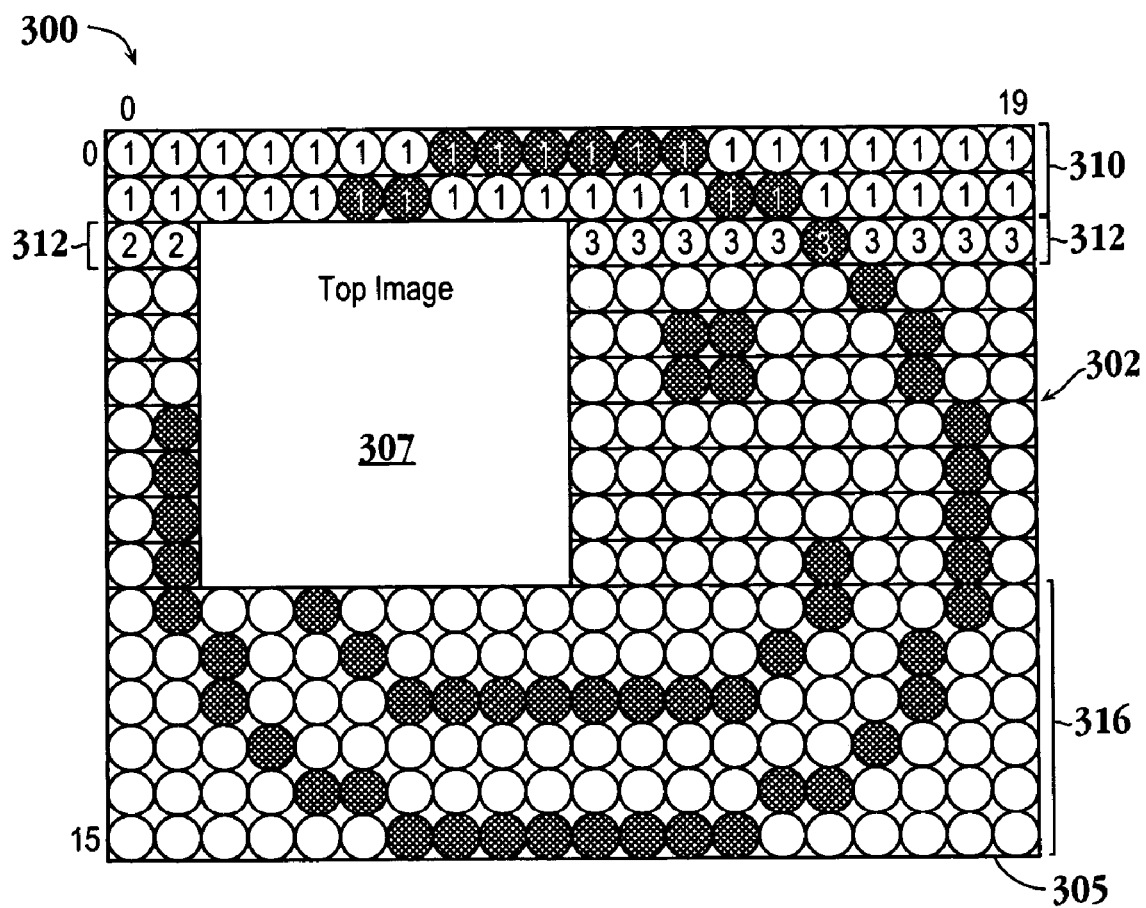
FIG. 5 shows an exemplary display illustrating an exemplary use of the exemplary display controller of FIGS. 2-4.

An example is shown by FIGS. 5-7C. FIG. 5 shows an exemplary display screen 300 displaying a two dimensional array of pixels 302 of 20 pixels across by 16 pixels down. A bottom image 305 depicts a smiley-face image and is displayed on the entire screen area. A top image 307 is defined by values stored in registers 208 and shown by a table 400 in FIG. 6. With a Cartesian coordinate system defined by an upper left pixel having coordinates 0,0 and a lower right pixel having coordinates 19,15, the top image starts at pixel 2,2 and ends at pixel 9,9, as represented in table 400 in FIG. 6.

During a quiescent period before display data is received from display data source 102, display interface 204 programs RAM integrated panel 108 to receive a first block of forthcoming data. Since the first two lines correspond only to pixels in the bottom image, display controller programs panel 108 with registers as shown in FIG. 7A, so that data received will be inserted starting with pixel 1,1 and ending with pixel 20,2. Thus a first rectangle 310 is populated with data comprising bottom image data.

The top image extends from the third to the tenth pixel of the third line, so display controller programs panel 108 to receive a second rectangle 312 comprising pixels 1,3 and 2,3 during the quiescent period between rows 2 and 3. The registers programmed are shown by table 420 in FIG. 7B.

Before pixel 10 is received, the display controller programs the display panel to receive a third rectangle 314 comprising pixels 10 through 19 of row 2. Data is programmed therefore as shown in table 430 of FIG. 7C. This process is repeated until the bottom of the top image is reached, and the remainder 316 of bottom image can be streamed to panel 108 as previously described. In this manner, video controller 200 passes video data directly from the image source to the RAM integrated panel 108 without ever storing the video data in VRAM and without overwriting top image 307.

There are several possibilities for writing the still image to panel 108. A first possibility is that display interface 204 receives data from host interface 206 during quiescent periods and passes this data along with appropriate control signals, etc, to panel 108. This is particularly useful for small top images that can be transmitted to panel 108 during the brief quiescent periods. In this case, referring to FIG. 4, data would pass through FIFO 220, JPEG CODEC 222, decode/resizer 224, FIFO 226, and video source interface 202 with these elements turned off.

In another embodiment, a still image can be inserted into the top image or bottom image areas simultaneously with the moving image. Referring to FIG. 5, after second rectangle 312 is passed to panel 108 (FIG. 4) the panel is programmed to receive pixels 2-9 of row 2 of the still image and the first line of still image data is passed to panel 108 before pixel 10 is received from display data source 102. In this case, still image data may be retrieved from host interface 206 or from FIFO 226.

In another embodiment, also referring to FIG. 4, where the video image is displayed as the bottom image, the still image may be loaded into FIFO 226. For one frame of video data, display interface 204 selects data from either the bottom image data stream or the top image from FIFO 226, depending upon whether the pixel corresponds to the top image or the bottom image. Thus, a composite image is sent to panel 108 including data from both the top image and bottom image without reprogramming registers in panel 108 when switching from the top image to the bottom image. Successive bottom images from the video data stream are refreshed as described above so as to not overwrite the top image.

In yet another embodiment, video data to panel 108 is halted by switching select signal 120 to place host interface in communication with panel 108 via bypass line 212. The stationary image data area is populated, the select signal is switched back and video refreshes are resumed. Depending on the refresh rate of the video. signal and data throughput, this process could occur entirely in quiescent time between frames or it could halt the video for one or more frames.

As described, the bottom image will normally display video and the top image some temporary information, it is possible to reverse this and display video in the top image so as not to obscure the video by various messages. The display controller may be configured to operate in only one mode such that the video is always displayed as the top image or always displayed as the bottom image, or the display controller may be configured to allow the user/programmer to select which mode to operate in.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for concurrently displaying an image and a video on a display panel, the display panel containing memory elements therein, the method comprising:
   receiving position data defining a position of a top image region of said display panel, said top image region being a portion of the display panel;
   receiving video data from a video source;
   in a first mode, passing said video data directly to said memory elements of said display panel when said video data corresponds to pixels outside said top image region and preventing said video data from being sent to said display panel when said video data corresponds to pixels in said top image region; and
   in a second mode, passing said video data directly to said memory elements of said display panel such that entire successive images are wholly displayed within said top image region.

2. The method of claim 1 wherein said passing said video data is performed by a display interface that is configured to operate only in one of said first mode or said second mode, and wherein passing said video data directly is performed without writing said video data into memory of a display controller housing the display interface.

3. The method of claim 1 wherein said passing said video data is performed by a display interface that is configured to selectively operate in said first mode or said second mode.

4. The method of claim 1, further comprising programming registers in said display panel to store said video data to a region of said display panel outside of said top image region in said first mode and within said top image region in said second mode.

5. The method of claim 1, further comprising:
   in said first mode, writing image data to said top image region during non-scan time of said video source, and in said second mode, writing said image data to a region of said display panel outside of said top image region during non-scan time of said video source.

6. The method of claim 5, wherein said image data is temporarily stored in a first-in-first-out (FIFO) memory.

7. The method of claim 1, further comprising:
   temporarily storing image data in a FIFO buffer; and
   in said first mode, writing said image data from said FIFO in place of said video data when said video data corresponds to pixels within said top image region.

8. The method of claim 5, further comprising:
   writing said image data to one of said top image region or said region outside of said top image region using a by-pass line by-passing a display interface.

9. A display controller for displaying a video and an image concurrently on a display panel containing memory elements therein, the display controller comprising:
   a display interface receiving video data from a video source;
   a plurality of registers for storing top image position data, said top image position data defining a top image region, which is a portion of the display panel; and
   said display interface comprising logic circuitry causing said video data to be supplied directly from said video source to said memory elements of said display panel according to one of a first mode or a second mode wherein when said display interface is in said first mode, video data corresponding to pixels outside of said top image region are passed directly to said display panel and video data corresponding to pixels inside said top image region are prevented from being passed to said display panel, and when said display interface is in said second mode said video data is passed directly to said top image region only such that entire successive images defined by said video data are wholly and successively displayed in said top image region.

10. The display controller of claim 9, wherein said display interface is configured to operate only in one of said first mode or said second mode.

11. The display controller of claim 9, wherein said display interface is configured to selectively operate in said first mode or said second mode.

12. The display controller of claim 9, wherein, when said display interface programs said memory elements of said display panel to store said video data to a region of said display panel outside of said top image region in said first mode, and within said top image region in said second mode.

13. The display controller of claim 9, wherein, when said display interface is in said first mode, said display interface writes image data to top image region during non-scan time of said video source and in said second mode, said display interface writes image data to said region of said display panel outside said top image region during non-scan time of said video source.

14. The display controller of claim 13, wherein said image data is temporarily stored in a first-in-first-out (FIFO) memory.

15. The display controller of claim 9, wherein image data is temporarily stored in a FIFO buffer, and in said first mode, said display interface writes said image data from said FIFO in place of said video data when said video data corresponds to pixels within said top image region.

16. An imaging device, comprising:
   a video capture device;
   a display controller receiving video data from said video capture device;
   a host, said host being a microprocessor; and
   a display panel, said display panel containing memory elements therein for displaying data stored in said memory as an image on a display screen, wherein
   said display controller includes a plurality of registers for storing top image position data, said top image position data defining a top image region which is a portion of the display panel, said display controller also including a display interface receiving said video data from said video capture device, said display interface comprising logic circuitry causing said video data to be supplied directly from said video capture device to said memory elements of said display panel according to one of a first mode or a second mode wherein when said display interface is in said first mode, video data corresponding to pixels outside of said top image region are passed directly to said memory elements of said display panel and video data corresponding to pixels inside said top image region are prevented from being passed to said display panel, and when said display interface is in said second mode said video data is passed directly to said top image region only such that entire successive images defined by said video data are wholly and successively displayed in said top image region.

17. The display controller of claim 16, wherein said display interface is configured to operate only in one of said first mode or said second mode.

18. The display controller of claim 16, wherein said display interface is configured to selectively operate in said first mode or said second mode.

19. The display controller of claim 16, wherein, when said display interface programs said memory elements of said display panel to store said video data to a region of said display panel outside of said top image region in said first mode, and within said top image region in said second mode.

20. The display controller of claim 16, wherein, when said display interface is in said first mode, said display interface writes image data to top image region during non-scan time of said video capture device and in said second mode, said display interface writes image data to said region of said display panel outside said top image region during non-scan time of said video capture device.

21. The display controller of claim 20, wherein said image data is temporarily stored in a first-in-first-out (FIFO) memory.

22. The display controller of claim 16, wherein image data is temporarily stored in a FIFO buffer, and in said first mode, said display interface writes said image data from said FIFO in place of said video data when said video data corresponds to pixels within said top image region.

* * * * *